United States Patent [19]

Brewer

[11] Patent Number: 4,686,773

[45] Date of Patent: Aug. 18, 1987

[54] STRUCTURE LEVELING SYSTEM

[76] Inventor: Aubrey W. Brewer, 6912 Martin Mill Pike, Knoxville, Tenn. 37902

[21] Appl. No.: 882,468

[22] Filed: Jul. 7, 1986

[51] Int. Cl.⁴ .......................... G01C 5/04; G01C 9/22
[52] U.S. Cl. ........................................................ 33/367
[58] Field of Search .................................. 33/367, 377

[56] References Cited

U.S. PATENT DOCUMENTS

| | | | |
|---|---|---|---|
| 386,924 | 7/1888 | Kegel | 33/367 |
| 451,680 | 5/1891 | Gamble | 33/367 |
| 915,084 | 3/1909 | Eberhard | 33/367 |
| 2,532,883 | 12/1950 | Bennett et al. | 33/367 |
| 3,015,167 | 1/1962 | Chapman | 33/367 |
| 3,132,428 | 5/1964 | Haissig et al. | 33/367 |
| 3,310,880 | 3/1967 | Watts | 33/367 |
| 3,680,216 | 8/1972 | Hallanger | 33/367 |

Primary Examiner—Richard R. Stearns
Attorney, Agent, or Firm—Charles E. Baxley

[57] ABSTRACT

A structure leveling sytem comprises a plurality of portable members each including a base having a bottom and a transparent tube open at its having a bottom and a transparent tube open at its top and upstanding from the base and provided with graduations at intervals along its length. The graduations on all tubes correspond, whereby like graduations on the tubes denote identical distances above the bottoms of the bases. The system also comprises flexible tubing interconnecting the bottoms of the tubes with each other. Liquid, such as water, is introduced into the system through the top of one of the tubes and the structure to be leveled in manipulated until the liquid level in all tubes is at corresponding graduations, thus denoting that the bottoms of the bases are at a common elevation and hence that the structure is level.

4 Claims, 4 Drawing Figures

STRUCTURE LEVELING SYSTEM

BACKGROUND OF THE INVENTION

This invention relates to a structure leveling system and more particularly to a system for use in leveling a billiard or pool table, hereinafter collectively referred to as a "billiard table". Other structure can also be leveled.

A billiard table of standard size presents a cloth covered rectangular playing surface 5 feet by 10 feet (1.52 m by 3.05 m), the cloth being laid on three slate slabs. The structure is extremely heavy, typically weighing on the order of one thousand pounds (454 kg) and yet the playing surface must be as close as possible to absolutely level. Furthermore, the table has six legs, one corresponding to each of the four corners and one along each of the two longer sides equi-spaced from the corner legs. Typically, each leg is provided with an adjustable leveling shoe that engages the floor on which the table is set and by means of which the length of each leg is adjustable.

Heretofore, the leveling of a billiard table, once in the desired floor location, has been a cumbersome task best performed by experts, and even professional billiard table installers experience difficulty in performing the leveling task.

It is not uncommon for an initially precisely leveled billiard table to require re-leveling from time to time, due to floor settling, or some other reason. Furthermore, the leveling should be checked from time to time. Heretofore, it has been necessary to have such re-leveling and checking performed with professional assistance.

It is an important object of the present invention to provide a simple system for leveling and re-leveling a billiard table and for checking the leveling of a billiard table, which system can be utilized by persons with little or no expertise in leveling billiard tables.

It is another object to provide a simple system for leveling, releveling and checking the leveling of other structures.

Other objects and advantages will appear hereinafter.

The following prior patents are noted, but none seems pertinent to the present invention:
Allen U.S. Pat. No. 259,454 issued June 13, 1882;
Clare et al. U.S. Pat. No. 3,137,091, issued June 16, 1964;
Artmann U.S. Pat. No. 3,144,234, issued Aug. 11, 1964;
Bain U.S. Pat. No. 3,768,766, issued Oct. 30, 1973; and
Leonhart U.S. Pat. No. 3,910,576, issued Oct. 7, 1975.

SUMMARY OF THE INVENTION

A structure leveling system according to the invention comprises a plurality of portable members each including a base having a bottom and a transparent tube open at its top and upstanding from the base and having graduations at intervals along its length. The graduations on all tubes correspond, whereby like graduations on the tubes denote identical distances above the bottoms of the bases. The system also comprises flexible tubing that interconnects the bottoms of the tubes with each other.

Liquid, such as water, is introduced into the system through the top of one of the tubes and the structure to be leveled is manipulated until the liquid level in all the tubes is at corresponding graduations, thus denoting that the bottoms of the bases are at a common elevation and hence that the structure is level.

DESCRIPTION OF THE INVENTION

Figure 1:
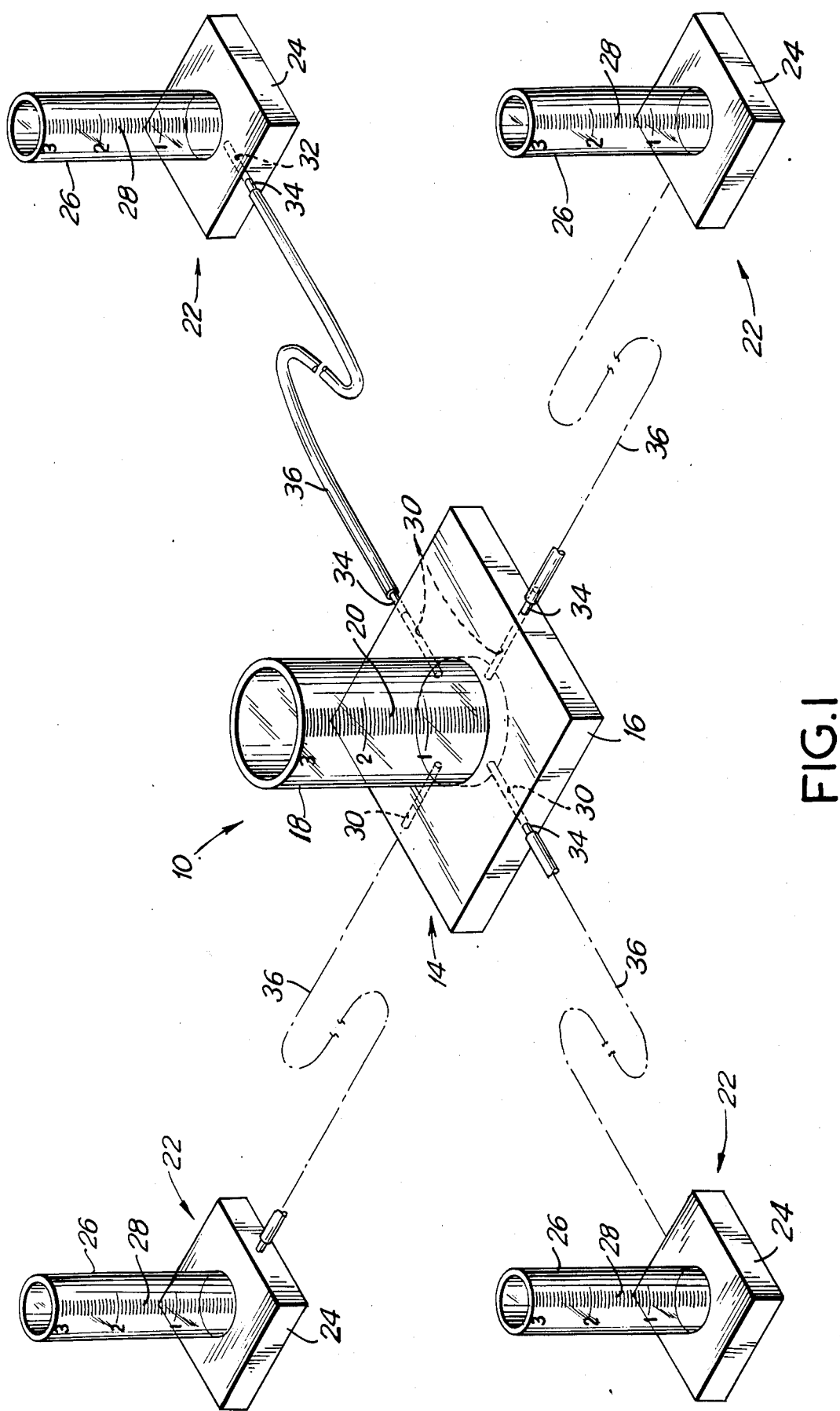
FIG. 1 is a perspective view of the elements of a preferred system embodying the invention for leveling, re-leveling and checking the leveling of a billiard table.

The invention will be described first with particular reference to FIG. 1 (and occasional reference to FIGS. 2 and 3), wherein are shown the elements of a system, indicated generally at 10, for leveling, re-leveling and checking the leveling of a billiard table 12.

System 10 comprises a main member 14 that includes a square base 16 having a flat bottom and that may measure four inches (10.2 cm) on each side and may have a vertical thickness of onehalf inch (1.27 cm), and that may be of acrylic resin. Upstanding from the center of base 16 is a tube 18, open at the top, of transparent material, such as acrylic resin. Tube 18 has an outer diameter of 2 inches (5.1 cm), a length of 3 inches (7.6 cm) and a wall thickness of 0.125 inch (0.32 cm), and is provided with graduations 20 at 0.0625 inch (0.16 cm) intervals along its length.

System 10 further comprises a plurality (four as shown) of identical satellite members 22, each of which includes a square base 24 having a flat bottom that may measure two inches (5.1 cm) on each side and may have a vertical thickness of one-half inch (1.27 cm), and that may be of acrylic resin. Upstanding from the center of base 24 is a tube 26, open at the top, of transparent material, such as acrylic resin. Tube 26 has an outer diameter of one inch (2.5 cm), a length of 3 inches (7.6 cm) and a wall thickness of 0.125 inch (0.32 cm), and is provided with graduations 28 at 0.0625 inch (0.16 cm) intervals along its length.

Graduations 20 and 28 correspond. That is, like graduations indicate identical distances above the bottoms of bases 16 and 24.

Base 16 is provided with four bores 30 extending horizontally from the center of base 16 to each of the four sides of base 16 and in open communication with a central bore extending part way through base 16 and in which the lower end of tube 18 is mounted in water tight manner. Tube 18 has four holes through its wall, each of the four holes being in open communication with one of bores 30.

Each base 24 is provided with a bore 32 extending horizontally from the center of base 24 to one of the four sides of base 24 and in open communication with a central bore extending part way through base 24 and in which the lower end of tube 26 is mounted in water tight manner. Tube 26 has a hole through its wall in open communication with bore 32.

Bores 30 and 32 are provided with one-quarter inch (0.64 cm) bibs 34 at their points of exit from bases 16 and 24, respectively, and four three-eighth inch (0.95 cm) diameter flexible tubing 36, each about 6 feet (1.8 m) long, connects base 16 with each of the four bases 24 of satellite members 32, such that tube 18 of main member 14 is in fluid communication with tube 26 of each satellite member 22, via bores 30, tubing 36 and bore 32 of each satellite member 22.

Figure 2:
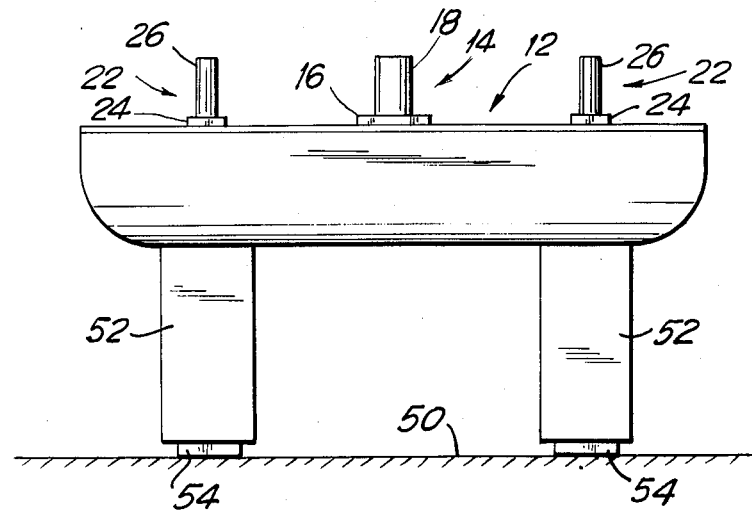
FIG. 2 is an end elevation of a billiard table showing thereon certain of the elements of the system of FIG. 1.
Figure 3:
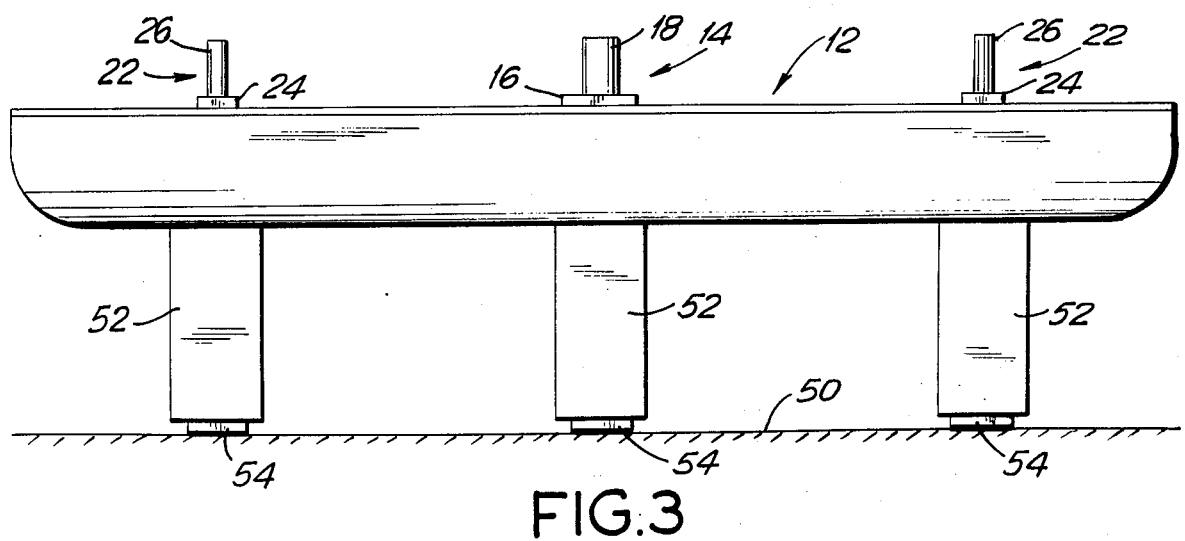
FIG. 3 is a view similar to FIG. 2 but showing the table in side elevation.

FIGS. 2 and 3 show table 12 after it has been placed in a desired location on a floor 50. Table 12 has six legs 52, including one corresponding to each of the four corners of table 12, and one leg along each of the two longer sides of table 12 equidistant from the corner legs 52.

Each leg 52 is provided with an adjustable leveling shoe 54 that engages floor 50 and by means of which the length of each leg 52 is adjustable, in known fashion.

The use of system 10 will now be explained, with reference to FIGS. 1–3.

Main member 14 is placed with its base 16 on table 12, near the center of its playing surface and satellite members 22 are placed with their bases 24 on table 12 at locations spaced from main member 14, preferably substantially above different ones of legs 52. Water or other incompressible liquid is then introduced into the open upper end of tube 18, until the water level in tubes 18 and 26 is visible in tubes 18 and 26. Care must be exercised not to overfill tubes 18 and 26.

Leveling shoes 54 are then manipulated until the liquid level in tube 18 and in all tubes 26 is at corresponding graduations 20 and 28. Table 12 is now leveled.

The elements of system 10 are now removed from table 12 and stored, after emptying the liquid from system 10.

Later on, the same procedure can be used to re-level table 12 or to check the leveling thereof.

Figure 4:
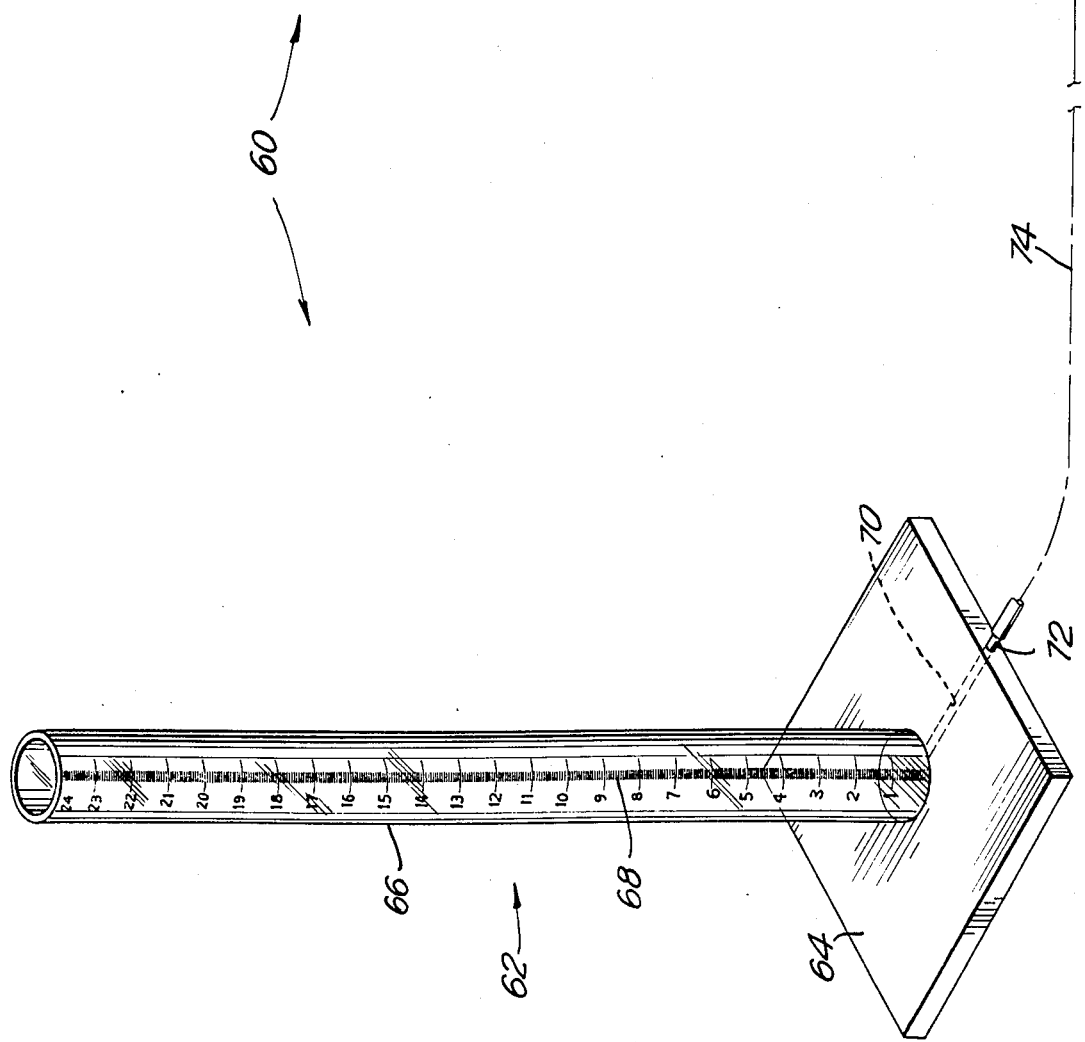
FIG. 4 is view similar to FIG. 1 but showing the elements of a modified system embodying the invention for leveling other structure.

FIG. 4 shows the elements of a modified system 60 that can be used in the leveling of any other structure (not shown), as by a structural contractor.

System 60 comprises two identical members 62, each including a square base 64 having a flat bottom and that may measure eight inches (20.4 cm) on each side and may have a vertical thickness of one-half inch (1.27 cm), and that may be of acrylic resin. Upstanding from the center of base 64 is a tube 66, open at the top, of transparent material, such as acrylic resin. Tube 66 has an outer diameter of 2 inches (5.1 cm), a length of 24 inches (61 cm) and a wall thickness of 0.125 inch (0.32 cm), and is provided with graduations 68 at 0.0625 inch (0.16 cm) intervals along its length like graduations 68 of the two tubes 66 indicating identical distances above the bottoms of the two bases 64.

Each base 64 is provided with a bore 70 extending horizontally from the center of base 64 to one of the four sides of base 64 and in open communication with a central bore extending part way through base 64 and in which the lower end of tube 66 is mounted in water tight manner. Tube 66 has a hole through its wall in open communication with base 70.

Each base 70 is provided with a one-quarter inch (0.64 cm) bib 72 at its point of exit from base 64, and three-eighth inch (0.95 cm) diameter flexible tubing 74 connects bases 64, such that tube 66 of one member 62 is in fluid communication with tube 66 of the other member 62, via bores 70 and tubing 74.

Tubing 74 may be 100 feet (30.5 m) long, and can be made up of five sections, each 20 feet (6.1 m) long.

The use of system 60 is similar to that of system 10. The two bases 64 are placed on two portions of the structure which are to be at the same height. Water is poured into one tube 66 through the top thereof until the water level in tubes 66 is visible in tubes 66. At least one of the two portions of the structure is then adjusted until the liquid level in the two tubes is at the same graduation 68.

It is noteworthy that members 14, 22 and 62 are portable, thereby giving systems 10 and 60 great flexibility in use.

It is apparent that the invention attains the stated objects and advantages and others.

The disclosed details are exemplary only and are not to be taken as limitations on the invention except as those details may be included in the appended claims.

What is claimed is:

1. A structure leveling system comprising a plurality of members each including a base having a bottom and a transparent tube open at its top and upstanding from said base and provided with graduations at intervals along its length, the graduations on all said tubes corresponding whereby like graduations on said tubes denote identical distances above the bottoms of said bases, and means including flexible tubing interconnecting the bottoms of said tubes with each other, said plurality of members including a main member and a plurality of identical satellite members, and said flexible tubing connecting the base of said main member and the base of each of said satellite members, the upstanding tube of said main member being of larger inside diameter than the upstanding tubes of said satellite members.

2. A system according to claim 1 wherein said tubes and said bases are of acrylic resin.

3. A system according to claim 1 wherein all of said tubes are of the same length.

4. A system according to claim 1 including four said satellite members.

* * * * *